(12) United States Patent
Kim et al.

(10) Patent No.: US 12,506,135 B2
(45) Date of Patent: Dec. 23, 2025

(54) FREE STANDING FILM FOR DRY ELECTRODE, MANUFACTURING METHOD THEREOF, DRY ELECTRODE COMPRISING THE SAME, AND SECONDARY BATTERY

(71) Applicant: LG Energy Solution, Ltd., Seoul (KR)

(72) Inventors: Taegon Kim, Daejeon (KR); Jeonggil Kim, Daejeon (KR); Myeongsoo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 718 days.

(21) Appl. No.: 17/801,151

(22) PCT Filed: Jan. 13, 2022

(86) PCT No.: PCT/KR2022/000598
§ 371 (c)(1),
(2) Date: Aug. 19, 2022

(87) PCT Pub. No.: WO2022/164090
PCT Pub. Date: Aug. 4, 2022

(65) Prior Publication Data
US 2023/0080191 A1    Mar. 16, 2023

(30) Foreign Application Priority Data

Jan. 27, 2021 (KR) .................. 10-2021-0011774
Jan. 10, 2022 (KR) .................. 10-2022-0003420

(51) Int. Cl.
*H01M 4/04* (2006.01)
*H01M 4/505* (2010.01)
(Continued)

(52) U.S. Cl.
CPC ....... *H01M 4/0404* (2013.01); *H01M 4/0435* (2013.01); *H01M 4/505* (2013.01);
(Continued)

(58) Field of Classification Search
CPC .. H01M 4/0404; H01M 4/0435; H01M 4/505; H01M 4/623; H01M 4/661;
(Continued)

(56) References Cited

U.S. PATENT DOCUMENTS 8,603,673 B2    12/2013  Shibuya
10,923,295 B2    2/2021  Raman et al.
(Continued)

FOREIGN PATENT DOCUMENTS

CN    101373827 A    2/2009
CN    104854743 A    8/2015
(Continued)

OTHER PUBLICATIONS

M Endo, Y.A Kim, T Hayashi, K Nishimura, T Matusita, K Miyashita, M.S Dresselhaus, Vapor-grown carbon fibers (VGCFs): Basic properties and their battery applications, Carbon, vol. 39, Issue 9, 2001, pp. 1287-1297 (Year: 2001).*
(Continued)

*Primary Examiner* — James M Erwin
*Assistant Examiner* — Sarah Arimintia Applegate
(74) *Attorney, Agent, or Firm* — Lerner David LLP

(57) ABSTRACT

A free-standing film for a dry electrode,
the free-standing film comprising an active material, a binder including a fibrous polymer, and a support.
The support is a surface-oxidized vapor grown carbon fiber (Ox-VGCF). A manufacturing method of the free-standing film, a dry electrode including the same, and a secondary battery are also provided.

16 Claims, 3 Drawing Sheets

(51) Int. Cl.
*H01M 4/62* (2006.01)
*H01M 4/66* (2006.01)
*H01M 10/052* (2010.01)
*H01M 10/0568* (2010.01)
*H01M 10/0569* (2010.01)
*H01M 4/02* (2006.01)

(52) U.S. Cl.
CPC .......... *H01M 4/623* (2013.01); *H01M 4/661* (2013.01); *H01M 10/052* (2013.01); *H01M 10/0568* (2013.01); *H01M 10/0569* (2013.01); *H01M 2004/021* (2013.01); *H01M 2004/028* (2013.01); *H01M 2300/0037* (2013.01)

(58) Field of Classification Search
CPC .......... H01M 10/052; H01M 10/0568; H01M 10/0569; H01M 2004/021; H01M 2004/028; H01M 2300/0037
See application file for complete search history.

(56) References Cited

U.S. PATENT DOCUMENTS

| | | |
|---|---|---|
| 2007/0026316 A1 | 2/2007 | Imachi et al. |
| 2007/0275302 A1* | 11/2007 | Sotowa .......... H01M 4/621 252/182.1 |
| 2011/0193014 A1 | 8/2011 | Sotowa et al. |
| 2012/0156560 A1 | 6/2012 | Hong et al. |
| 2014/0234724 A1 | 8/2014 | Nakamura et al. |
| 2014/0242468 A1 | 8/2014 | Song et al. |
| 2015/0270552 A1 | 9/2015 | Lee et al. |
| 2015/0303481 A1* | 10/2015 | Duong .......... H01M 4/625 241/5 |
| 2018/0331389 A1 | 11/2018 | Liu et al. |
| 2019/0036102 A1 | 1/2019 | Pierce et al. |
| 2019/0237748 A1 | 8/2019 | Shin et al. |
| 2019/0280289 A1 | 9/2019 | Zhang et al. |
| 2020/0313191 A1* | 10/2020 | Wixom .......... H01M 4/139 |
| 2021/0193398 A1 | 6/2021 | Raman et al. |
| 2023/0411584 A1 | 12/2023 | Yudi et al. |
| 2024/0063400 A1 | 2/2024 | Delaporte et al. |

FOREIGN PATENT DOCUMENTS

| | | |
|---|---|---|
| CN | 105098143 A | 11/2015 |
| CN | 108365168 A | 8/2018 |
| CN | 110073531 A | 7/2019 |
| CN | 112219299 A | 1/2021 |
| JP | 2004362777 A | 12/2004 |
| JP | 2011029408 A | 2/2011 |
| JP | 2012528451 A | 11/2012 |
| JP | 2013-077479 A | 4/2013 |
| JP | 5580910 B1 | 8/2014 |
| JP | 2014-170739 A | 9/2014 |
| JP | 2015053283 A | 3/2015 |
| JP | 2020202159 A | 12/2020 |
| KR | 20070015001 A | 2/2007 |
| KR | 20140114799 A | 9/2014 |
| KR | 20180119158 A | 11/2018 |
| KR | 20200090744 A | 7/2020 |
| WO | 2014148819 A1 | 9/2014 |
| WO | 2017084101 A1 | 5/2017 |
| WO | 2017197299 A1 | 11/2017 |
| WO | 2019222110 A1 | 11/2019 |

OTHER PUBLICATIONS

Yamada, M.; Watanabe, T.; Gunji, T.; Wu, J.; Matsumoto, F. Review of the Design of Current Collectors for Improving the Battery Performance in Lithium-Ion and Post-Lithium-Ion Batteries. Electrochem 2020, 1, 124-159. https://doi.org/10.3390/electrochem1020011 (Year: 2020).*

Yun Xu, J. et al., "Preparation, electrical and mechanical properties of vapor grown carbon fiber (VGCF)/vinyl ester composites" Composites: Part A. Elsevier Ltd, Feb. 2004, pp. 693-701, vol. 35. (Year: 2004).*

Jun Yan, Qian Wang, Tong Wei, Lili Jiang, Milin Zhang, Xiaoyan Jing, and Zhuangjun Fan. Template-Assisted Low Temperature Synthesis of Functionalized Graphene for Ultrahigh Volumetric Performance Supercapacitors ACS Nano 2014 8 (5), 4720-4729. (Year: 2014).*

Extended European Search Report including Written Opinion for Application No. 22744367.8, dated Nov. 13, 2024—12 pgs.

Hippauf Felix, et al, "Overcoming binder limitations of sheet-type solid-state cathodes using a solvent-free dry-film approach", ScienceDirect, Energy Storage Materials, Sep. 2019, 20 pages (pp. 390-398), vol. 21, XP093219880.

Yoonessi M. et al., "Neutron scattering, electron microscopy and dynamic mechanical studies of carbon nanofiber/phenolic resin composites" Science Direct, Elsevier Ltd, Jan. 2008, pp. 577-588, Carbon, vol. 46.

Jun Xu, J. et al., "Preparation, electrical and mechanical properties of vapor grown carbon fiber (VGCF)/vinyl ester composites" Composites: Part A. Elsevier Ltd, Feb. 2004, pp. 693-701, vol. 35.

International Search Report for Application No. PCT/KR2022/000598 mailed May 2, 2022 , pp. 1-3.

Search Report dated Feb. 25, 2025 from the Office Action for Chinese Application No. 202280002404.7 issued Mar. 1, 2025. 3 pages (see p. 1-2, categorizing the cited references).

* cited by examiner

[FIG. 1]
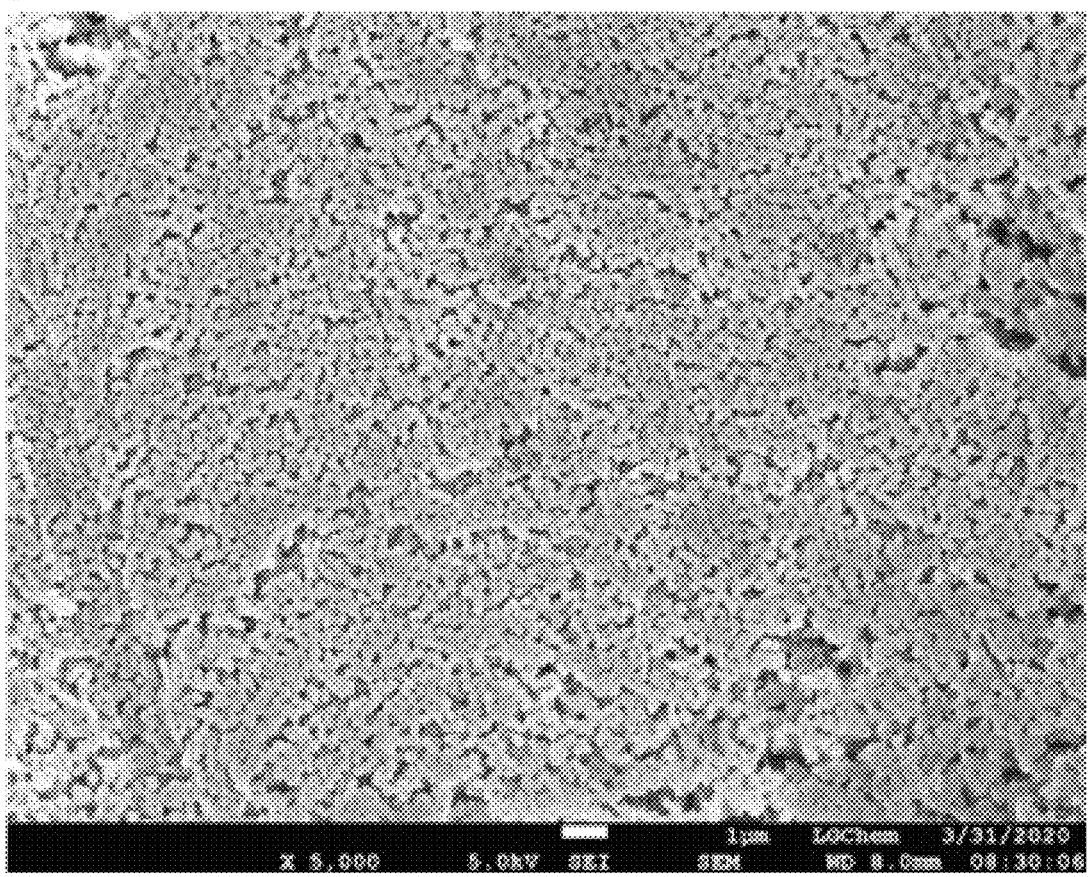

[FIG. 2]
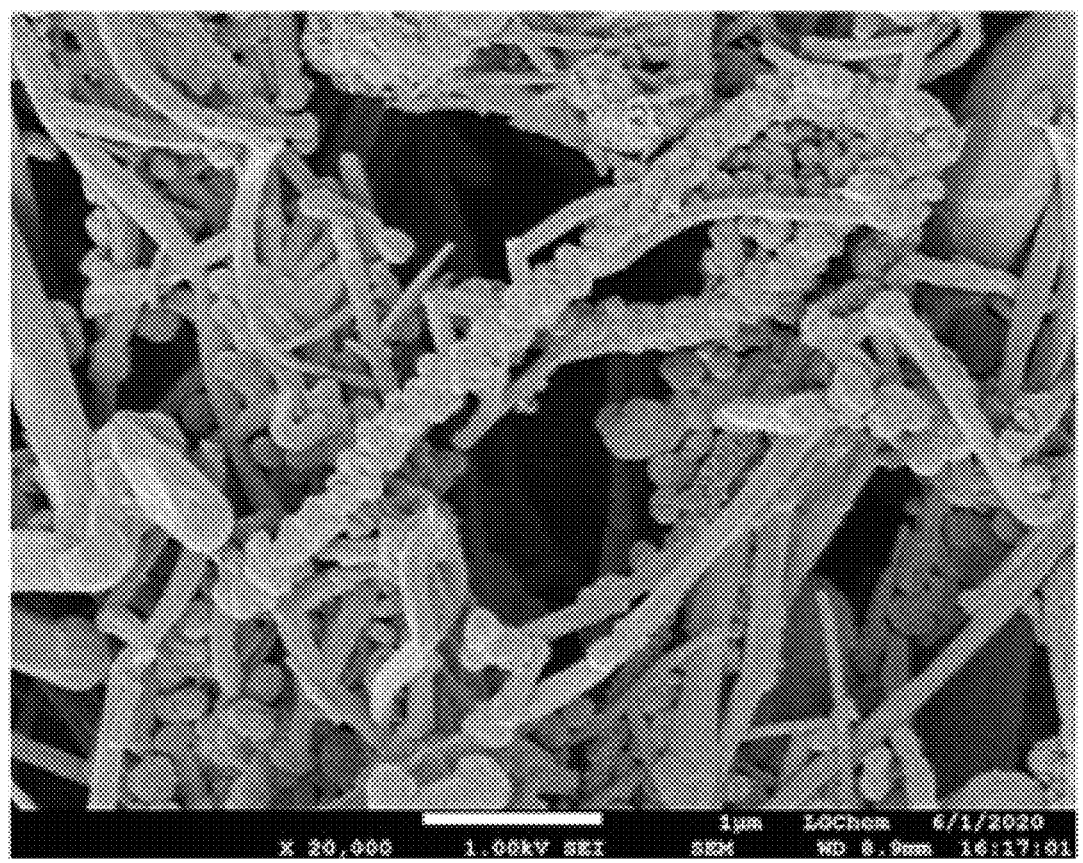

[FIG. 3]
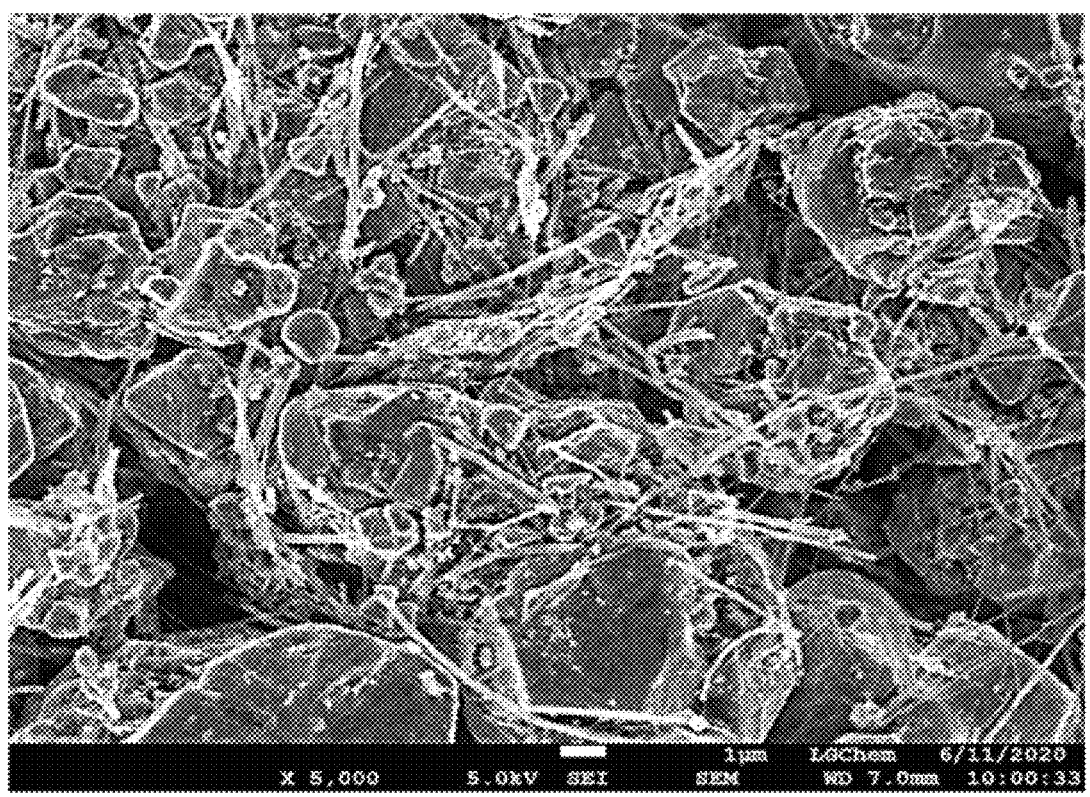

FREE STANDING FILM FOR DRY ELECTRODE, MANUFACTURING METHOD THEREOF, DRY ELECTRODE COMPRISING THE SAME, AND SECONDARY BATTERY

CROSS-REFERENCE TO RELATED APPLICATIONS

The present application is a national phase entry under 35 U.S.C. § 371 of International Application No. PCT/KR2022/000598, filed on Jan. 13, 2022, which claims priority to Korean Patent Application No. 10-2021-0011774, filed on Jan. 27, 2021, and Korean Patent Application No. 10-2022-0003420, filed on Jan. 10, 2022, the contents of which are incorporated herein by reference in their entirety.

TECHNICAL FIELD

The present disclosure relates to a free-standing film for dry electrode, a manufacturing method thereof, a dry electrode including the same, and a secondary battery

BACKGROUND

Due to the rapid increase in the use of fossil fuels, the demand for the use of alternative energy or clean energy is increasing, and as a part thereof, the fields that are being studied most actively are the fields of power generation and power storage using electrochemistry.

Currently, a secondary battery is a representative example of an electrochemical device that utilizes such electrochemical energy, and the range of use thereof tends to be gradually expanding.

Among these secondary batteries, a typical lithium secondary battery is being used not only as an energy source for mobile devices, but also as a power source for an electric vehicle and a hybrid electric vehicle which can replace a vehicle using fossil fuels such as a gasoline vehicle and a diesel vehicle, which are one of the main causes of air pollution. The area of use is being expanded even in applications such as electric power auxiliary power source through grid formation.

The manufacturing process of such a lithium secondary battery is largely divided into three processes: an electrode process, an assembly process, and a formation process. The electrode process is again divided into an active material mixing process, an electrode coating process, a drying process, a rolling process, a slitting process, a winding process, and the like.

Among them, the active material mixing process is a process of mixing a coating material for forming an electrode active layer in which an actual electrochemical reaction occurs in the electrode. Specifically, it is prepared in the form of a slurry having fluidity by mixing an electrode active material that is an essential element of an electrode, a conductive material and a filler that are other additives, a binder for binding between particles and adhering to a current collector, a solvent for imparting viscosity and dispersing particles, and the like.

The composition mixed for forming the electrode active layer in this way is also referred to as an electrode mixture in a broad sense.

After that, an electrode coating process of applying the electrode mixture onto an electrically conductive current collector, and a drying process of removing the solvent contained in the electrode mixture are performed, and additionally, the electrode is rolled and manufactured to a predetermined thickness.

Meanwhile, as the solvent contained in the electrode mixture evaporates during the drying process, defects such as pinholes or cracks may be induced in the pre-formed electrode active layer. Further, since the inside and outside of the active layer are not dried uniformly, the particle floating phenomenon occurs due to the difference in solvent evaporation speed, that is, the particles of the portion to be dried first may float up, and a gap may be formed with the portion to be dried relatively later, so that the electrode quality may be deteriorated. Particularly, in the case of thick-film coating, since it takes more time to evaporate the solvent when the electrode dries, and the floating phenomenon of the relatively light conductive material and binder is deepened, there is a fatal drawback that manufacture of a high-quality electrode is difficult.

Therefore, in order to solve the above problems, a drying device capable of adjusting the evaporation speed of the solvent while allowing the inside and outside of the active layer to be dried uniformly is being considered, but such drying devices are very expensive and require considerable cost and time to operate, which are disadvantageous in terms of the manufacturing processability.

Therefore, recently, active research has been carried out on the production of a dry electrode that does not use a solvent.

The dry electrode is generally manufactured by laminating a freestanding film produced in the form of a film containing an active material, a binder, a conductive material and the like, on a current collector.

Therefore, it is in the spotlight as an innovative technology that enables manufacture of a thick-film electrode, makes the use of an organic solvent harmful to the human body unnecessary, and simultaneously solves the high process costs due to a long drying.

Meanwhile, when manufacturing such a dry electrode, polytetrafluoroethylene (PTFE) powder is mainly used as a binder. In such a PTFE, a long fibrous structure having an atomic arrangement of ($-CF_2-CF_2-$)n is aligned one after another inside primary particles having a diameter of several hundred nm or less. When a shear force is applied under certain conditions, they is pulled out long into fibers, and such PTFE nanofibers play a role in connecting the active material and the conductive material like a rope to maintain the electrode morphology.

However, since the PTFE is easily fiberized at room temperature (19° C. or more) even by a very small shear force, even a slight movement causes a fatal drawback of agglomerating with the surrounding PTFE particles.

Therefore, in such a dry electrode, it is a core technology that the PTFE primary particles can be uniformly dispersed under the process conditions where no shear force is applied. Thereby, there is an urgent need to develop a technology that can realize an electrode by binding an active material through fiberization with only a small amount of PTFE.

DETAILED DESCRIPTION OF THE INVENTION

Technical Problem

The present disclosure has been designed to solve the above-mentioned problems, and an object of the present disclosure is to provide a free-standing film that enables uniform dispersion of PTFE primary particles, enhances the efficiency of PTFE binder application, and firmly forms a conductive network, thereby improving battery performance, and a manufacturing method thereof.

Another object of the present disclosure is to provide a dry electrode comprising the free-standing film, and a secondary battery comprising the same.

Technical Solution

According to one embodiment of the present disclosure, there is provided a free-standing film for dry electrode, the free-standing film comprising an active material, a binder including a fibrous polymer, and a support, wherein the support is a surface-oxidized vapor grown carbon fiber (Ox-VGCF).

At this time, the fibrous polymer may be fiberized to bind the active material and the support.

In one specific embodiment, the support may be a carbon fiber in which a surface oxygen functional group is increased by surface oxidation treatment, wherein the support may include a surface oxygen functional group in an amount of 5 to 15 wt % based on the total weight.

Further, the support may have an average diameter of 50 nm to 500 nm, an average length of 1 μm to 30 μm, and a specific surface area of 10 $m^2$/g to 150 $m^2$/g.

Moreover, the support may have a graphitization degree of 0.1 to 2.0.

Further, in one specific embodiment, the support may be contained in an amount of 0.1 wt % to 10 wt % based on the total weight of the free-standing film.

In one specific embodiment, the fibrous polymer may be polytetrafluoroethylene (PTFE).

According to another embodiment of the present disclosure, there is provided a method for manufacturing the free-standing film, the method comprising the steps of:

(a) mixing a binder including a fibrous polymer, and a support to obtain a mixture;

(b) mixing the mixture and the active material together and high-shear mixing the resulting mixture to obtain a fiberization composition; and (c) forming the fiberization composition into a film form, wherein the support is a surface-oxidized vapor grown carbon fiber (Ox-VGCF).

The fibrous polymer may be polytetrafluoroethylene (PTFE).

In one specific embodiment, the mixing in the step (a) may include simply mixing the binder including a fibrous polymer and the support at 19° C. or less, or charging the binder including a fibrous polymer and the support mixture together into a grinder after the mixing.

Here, the grinder may be an air jet mill.

In this case, the mixture may have a structure in which primary particles of the fibrous polymer are uniformly dispersed and supported on the surface of the support.

In one specific embodiment, the high-shear mixing of step (b) may be performed in the range of 10 rpm to 500 rpm for 1 minute to 30 minutes.

In one specific embodiment, the forming of step (c) may be performed by a hot rolling method by a calender.

Meanwhile, according to another embodiment of the present disclosure, there is provided a dry electrode comprising: a current collector, and the free-standing film which is formed on the current collector, wherein the current collector has a structure in which a primer layer is coated on a metal foil.

Meanwhile, according to yet another embodiment of the present disclosure, there is provided a secondary battery comprising the dry electrode, wherein an electrode assembly including the dry electrode, a counter electrode, and a separator is incorporated into a battery case together with a lithium-containing non-aqueous electrolyte.

BRIEF DESCRIPTION OF THE DRAWINGS

FIG. 1 is an SEM photograph according to Reference Example.

FIG. 2 is an SEM photograph according to Preparation Example 1 of the present disclosure.

FIG. 3 is an SEM photograph of the fiberization composition according to Example 1.

DETAILED DESCRIPTION OF THE EMBODIMENTS

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a," "an," and "the" are intended to include the plural forms as well, unless the context clearly indicates otherwise.

Further, throughout the specification, when a portion is referred to as "including" a certain component, it means that the portion can further include other components, without excluding the other components, unless otherwise stated.

According to one embodiment of the present disclosure, there can be provided a free-standing film for dry electrode, the free-standing film comprising an active material, a binder including a fibrous polymer, and a support, wherein the support is a surface-oxidized vapor grown carbon fiber (Ox-VGCF).

At this time, the fibrous polymer can be fiberized to bind the active material and the support. As described above, in the free-standing film for dry electrode, the fibrous polymers bundles and connects other powders like a rope without a solvent while being fiberized, and serves to bind them to each other. Therefore, their dispersibility is very important. If the dispersion is not properly performed, it is not possible to manufacture a free-standing film, or even if it is manufactured, it will be difficult to secure the physical properties of the free-standing film. Thus, desorption of active materials is likely to occur in the process of rolling, etc. After that, the life characteristics may be sharply lowered depending on the operation of the battery.

In this regard, the present inventors have found that when the binder including a fibrous polymer is added at the time of mixing for the manufacture of a free-standing film, the fibrous polymer nanoparticles exist in a densified state as shown in FIG. 1 and it is not easy for these primary particles to easily agglomerate and disperse even with a small shear force, whereby the free-standing film cannot be manufactured robustly, the efficiency is greatly reduced, which finally affects the electrode physical properties, and leads to deterioration of the battery characteristics.

Therefore, the present inventors have found through in-depth research that when a support is first mixed with a binder including a fibrous polymer and used for manufacturing the free-standing film, dispersion of the fibrous polymer is facilitated. Particularly, the inventors have found that in the surface-oxidized vapor grown carbon fiber (Ox-VGCF), the surface oxygen functional group is introduced into the surface of the Ox-VGCF and the nano-sized fibrous polymer primary particles are easily adsorbed on the surface of the support by the increased oxygen functional group, and are dispersed more easily. Additionally, the inventors have found that when this mixture is subsequently mixed with an active material and the like to form fibers, the active material can be bound as a whole, thereby improving the performance of the dry electrode and battery using the same, and completed the present disclosure.

At this time, the support may be one in which the surface oxygen functional group is increased to 5 to 15 wt %, specifically, to 8 to 12 wt %, compared to VGCF without surface oxidation treatment.

The content of oxygen functional groups on the surface can be determined by Elemental Analysis. Specifically, the C, H, N element content of the support is measured by elemental analyzer (CHN-coder MT-5, Yanako) to calculate the Oxygen Differential by reflecting the amount of residual ash.

When the surface oxygen functional group is sufficiently contained in this way, the nano-sized fibrous polymer primary particles are easily adsorbed on the surface of the support, which is preferable. When the content is too high, it causes a problem such as an electrochemically surface side reaction, which is not preferable.

Further, the support may have an average diameter of 50 nm to 500 nm, and an average length of 1 μm to 30 μm. More specifically, the average diameter may be 100 nm to 200 nm, and the average length may be 1 μm to 15 μm.

If the average diameter is too small outside the above range, there is a problem that the radius of curvature is small and thus, it is difficult to support due to mutual interference between the primary particles of the fibrous polymer. If it is too thick, the dispersion/supporting efficiency is greatly reduced, which is thus not preferable. Further, if the average length is too long, the powder fluidity is greatly reduced and the dispersion/supporting efficiency is lowered. If the average length is too short, the aggregation ratio between the supports is increased, and it is also undesirable for forming a long conductive network between active materials. Therefore, in order to sufficiently disperse the binder including a fibrous polymer of the present disclosure, it is preferable to use Ox-VGCF having a predetermined thickness as in the above range, excellent linearity, and a surface oxygen functional group.

The average diameter and average length of the support can be measured by SEM. More specifically, the support solution diluted to 1 wt % in acetone solvent is dropped on the Si wafer and dried, which is measured with SEM (Scanning Electron Microscopy, JEOL, JSM-7500F), and an average value of diameter and length for 300 individuals can be obtained.

Further, the specific surface area of the support for uniform dispersion of the fibrous polymer may be 10 $m^2/g$ to 150 $m^2/g$, specifically 10 $m^2/g$ to 100 $m^2/g$.

The specific surface area may be measured by a Brunauer-Emmett-Teller (BET) method. For example, the specific surface area can measure by a 6-point BET method according to nitrogen gas adsorption using a specific surface area analyzer (Belsorp-II mini by Bell Japan Inc).

When the fibrous polymer has the above specific surface area, the fibrous polymer can be easily dispersed and supported. If a specific surface area is too small outside the above range, it is not easy to disperse the fibrous polymer, and if the specific surface area is too large, gas or the like is generated due to a side reaction with the electrolyte solution, which is not preferable.

Further, the support is made of a carbon material having excellent electrical conductivity, and has a cylindrical tube shape with excellent linearity and thus has a large specific surface area. Therefore, the formation of a conductive network between active materials in the free-standing film can be further strengthened, and thus the inclusion of the support is more preferable.

Moreover, the graphitization degree (ID/IG ratio) of the support having an increased surface oxygen functional group may be 0.1 to 2.0.

The graphitization degree (ID/IG ratio) is obtained through Raman spectrum measurement. In the Raman spectrum, the G peak near 1590 $cm^{-1}$ derives from the E2g vibrational mode of the sp2 bond of carbon, and the D peak near 1350 $cm^{-1}$ appears when there is a defect in the sp2 bond of carbon. The lower the ID/IG ratio (D/G Peak Intensity Ratio), the higher the graphitization degree. Thereby, when using carbon-based particles having a high graphitization degree, the capacity and electrical properties of the battery can be improved due to the high electrical conductivity of the carbon-based particles.

Meanwhile, such a support may be included in an amount of 0.1 wt % to 10 wt %, specifically, 0.5 wt % to 10 wt %, based on the total weight of the free-standing film.

If the content is too high outside the above range, the content of active material may be reduced compared to the limit of the effective aspect, which is not preferable from the viewpoint of energy density. Meanwhile, when the content is too small, a sufficient dispersion effect of the fibrous polymer cannot be obtained.

Meanwhile, the fibrous polymer may be polytetrafluoroethylene (PTFE). The fibrous polymer may be included in an amount of 50 wt % or more, or may be 100 wt %, based on the total weight of the binder.

Further, the binder may further include polyethylene oxide (PEO), polyvinylidene fluoride (PVdF), polyvinylidene fluoride-co-hexafluoropropylene (PVdF-HFP), and the like, in addition to the polytetrafluoroethylene. In addition, it can further include other binders known in the art, and may vary depending on whether the dry electrode is a positive electrode or a negative electrode.

Further, the active material can also differ depending on whether the dry electrode is a positive electrode or a negative electrode.

In order to manufacture a free-standing film for forming the dry positive electrode, the active material is not limited as long as it is in the form of lithium transition metal oxide, lithium metal iron phosphate, or metal oxide. For example, the active material may be a layered compound such as lithium cobalt oxide ($LiCoO_2$) or lithium nickel oxide ($LiNiO_2$) or a compound substituted with one or more transition metals; lithium manganese oxides such as chemical formula $Li_{1+x}Mn_{2-x}O_4$ (where x is 0 to 0.33), $LiMnO_3$, $Li_2MnO_3$, $LiMn_2O_3$, $LiMnO_2$; lithium copper oxide ($Li_2CuO_2$);

vanadium oxides such as $LiV_3O_8$, $LiV_3O_4$, $V_2O_5$, and $Cu_2V_2O_7$; a Ni-site type lithium nickel oxide represented by chemical formula $LiNi_{1-x}M_xO_2$ (where M=Co, Mn, Al, Cu, Fe, Mg, Ca, Zr, Ti, B, P, W, Si, Na, K, Mo, V, Nb, Ru or Ga, and x=0.01 to 0.3); lithium manganese composite oxide represented by chemical formula $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ with a Li portion of the chemical formula substituted with an alkaline earth metal ion; lithium metal phosphate $LiMPO_4$ (where M=Fe, CO, Ni, or Mn), a disulfide compound; $Fe_2(MoO_4)_3$ and the like, but is not limited thereto.

In order to manufacture a free-standing film for forming the dry negative electrode, the active material may include carbons such as hardly graphitizable carbon and graphite-based carbon, metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, 3 elements in the periodic table, halogen; $0 < x \leq 1$; $1 \leq y \leq 3$; $1 \leq z \leq 8$); lithium metal; lithium alloys; silicon-based alloys; tin-based alloys; silicon-based oxides such as SiO, SiO/C, $SiO_x$ ($1 < x < 2$), $SiO_2$; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni based materials, and the like.

However, the active material for manufacturing the free-standing film may be, specifically, a positive electrode active material, and more specifically, lithium transition metal oxide, lithium nickel-manganese-cobalt oxide, oxides in which lithium nickel-manganese-cobalt oxides are partially substituted with different transition metals, lithium iron phosphate, or the like.

Meanwhile, in the case of a negative electrode using graphite as the main active material, it is not necessary to use a conductive material having a large specific surface area compared to the application of the positive electrode active material, or the use amount thereof can be greatly reduced. Therefore, it is easy to implement a dry electrode that fiberizes the PTFE binder compared to the positive electrode. However, generally, since the negative electrode material using the silicon-based active material has a relatively high capacity compared to the positive electrode material, and thus the thickness of the negative electrode is implemented thinner than that of the positive electrode in the electrode design, so that the difficulty in the process may increase in terms of manufacturing the free-standing film.

Meanwhile, the free-standing film may further include a conductive material, wherein the conductive material is not particularly limited as long as it has high conductivity without causing a chemical change in the corresponding battery, and for example, graphite such as natural graphite and artificial graphite; graphene; active carbon; active carbon fiber; carbon blacks such as carbon black, acetylene black, ketjen black, channel black, furnace black, lamp black, and thermal black; conductive fibers such as carbon fiber and metal fiber; metal powders such as carbon fluoride, aluminum, and nickel; conductive whiskey such as zinc oxide and potassium titanate; conductive metal oxides such as titanium oxide; conductive materials such as polyphenylene derivatives may be used. Specifically, the conductive material may include at least one selected from the group consisting of active carbon, graphite, carbon black, graphene and single-walled or multi-walled carbon nanotubes for uniform mixing and improvement of conductivity, and more specifically, it may include carbon black or an active carbon.

At this time, the active material, the conductive material and the binder containing fibrous polymer and support may be included such that the weight ratio of the active material: the conductive material: the binder containing fibrous polymer and support is 60 to 99.8 wt %:0 to 20 wt %:0.2 to 20 wt %, specifically, 80 to 99 wt %:0.1 to 10 wt %:0.9 to 10 wt %.

If the content of the binder and the support is too high outside the above range, the fibrous polymer of the binder becomes stiff while being excessively fiberized at a later time, whereby a load may be applied to the equipment on the process and the resistance to the electrode itself may be greatly increased. On the contrary, if the content of the binder and the support is too small, sufficient fiberization is not achieved, which may cause a problem that manufacture of a free-standing film is difficult or electrode physical properties such as electrode detachment are deteriorated.

If the content of the conductive material is too high outside the above range, the content of the active material is relatively reduced which may cause a problem that the volume is reduced, and the fiberization of PTFE may be hindered. On the contrary, if the content of the conductive material is too low, it may not be possible to ensure sufficient conductivity, or the physical properties of the electrodes of the free-standing film may be deteriorated, which is not preferable.

Meanwhile, in some cases, a filler, which is a component for suppressing the expansion of the electrode, may be further added to the mixture. The filler is not particularly limited as long as it is a fibrous material without causing a chemical change in the corresponding battery. For example, olefine-based polymers, such as polyethylene and a polypropylene; a fibrous material such as glass fiber or carbon fiber is used.

Furthermore, according to another embodiment of the present disclosure, there is provided a method for manufacturing the free-standing film, the method comprising the steps of:
(a) mixing a binder including a fibrous polymer and a support to obtain a mixture;
(b) mixing the mixture and the active material together and high-shear mixing the resulting mixture to obtain a fiberization composition; and
(c) forming the fiberization composition into a film form, wherein the support is a surface-oxidized vapor grown carbon fiber.

The contents relating to materials such as binders, supports, and active materials including the basic fibrous polymer are the same as those described above.

Meanwhile, in the present disclosure, unlike the prior art, the binder including the fibrous polymer is first mixed with the support to obtain a mixture as in step (a). At this time, the mixing is performed so that no shear force is applied.

When a shear force is applied, fibrization of the fibrous polymer can occur in combination with mixing. As for the subsequent binding of the active material and the conductive material, the effectiveness thereof is greatly reduced.

Specifically, the mixing of step (a) can be performed by simply mixing the binder containing a fibrous polymer and the support at 19° C. or less, or by adding the binder including a fibrous polymer and the support mixture to a grinder together after mixing. Here, the grinder may be, for example, an air jet-mill.

The reason for mixing under a low temperature of 19° C. or less is that by mixing below the phase transition temperature of PTFE, which is mainly used as a fibrous polymer, the fiberization by shear is prevented.

Further, in the case of the application of the air jet-mill, the particles are grinded by impact between particles mixed in an air atmosphere rotating at high pressure/high speed, but the application of high shear force resulting from a general impeller-applied mixer is suppressed, whereby the PTFE primary particles are crushed without being fiberized by impact and can be uniformly dispersed/supported on the support surface.

Meanwhile, there may be a predetermined difference in the structure of the mixture depending on the difference in the mixing method.

Specifically, when performing only simple mixing of the binder including a fibrous polymer and the support at 19° C. or less, the binder including the fibrous polymer may be uniformly dispersed and mixed together with the support.

Meanwhile, when the binder and the support mixture are added to a grinder such as an air jet-mill to which only an impact is applied without shear force and further mixed, the primary particles of the fibrous polymer may be uniformly dispersed and supported along the surface of the support as shown in FIG. 2 below.

Particularly, when a mixture of the support and the binder including a fibrous polymer is put into a grinder such as an air jet-mill and mixed so that the primary particles of the fibrous polymer are uniformly dispersed and supported on the surface of the support, the dispersion effect is more excellent compared to the case of applying only simple mixing, and accordingly, electrode characteristics and battery performance are further improved, whereby the electrode characteristics and battery performance are further improved. In detail, the mixing may be performed by putting the primary particles of the fibrous polymer on the surface of the support to form a structure in which they are uniformly dispersed and supported, such as an air jet-mill.

In this case, the binder including a fibrous polymer and the support can be mixed in a weight ratio of 20:80 to 50:50.

If the content of the support is too large outside the above range, the degree of fiberization of the fibrous polymer is not satisfactory, which causes a problem that the quality of the electrode is deteriorated. When the content is too small, sufficient dispersion effect of the fibrous polymer cannot be acquired, which is not preferable.

At this time, the simple mixing may be, for example, a process of mixing may be performed using a powder mixer (KM Tech) equipped with a cooler cooled to about 5° C. to minimize heat generation in the mixer at 3000 rpm to 5000 rpm for 30 seconds to 1 minute twice to 5 times, specifically three times.

The mixing is carried out, and the mixing that is further performed in a grinder is performed so that shear force is not applied. For example, when using a grinder such as an Air Jet-mill (Sturtevant, Micronizer), the feeding conditions of the mixture may be 4 kgf/cm² to 6 kgf/cm², and the grinding conditions may be performed at 2 kgf/cm² to 4 kgf/cm².

Then, the mixture obtained in step (a) is mixed together with the active material and the conductive material.

At this time, the mixing of step (b) can be mixed using a powder mixer (KM Tech) equipped with a cooler cooled to about 5° C. in the same way as in the pre-mixing, in order to ensure dispersion uniformity, and specifically, the mixing can be performed 2 to 5 times, specifically 3 times at 5000 rpm to 20000 rpm for 30 seconds to 1 minute.

Then, high shear mixing is applied to obtain a fiberization composition, wherein the high shear mixing means the degree to which the fibrous polymer can be fiberized. Specifically, the high shear mixing may be performed in a range of 10 rpm to 500 rpm for 1 minute to 30 minutes. At this time, the high shear mixing may be performed by, for example, putting it into a Twin Screw Kneader (PBV-0.1L by Irei Shokai). If the shear force is not sufficiently applied, sufficient fiberization of the fibrous polymer may not be achieved, and if the shear force is too large, the fiberized fibrous polymer may break, which is undesirable.

Additionally, the mixing temperature of the high shear mixing for preparing the fiberization composition may be from 20 to 120° C., specifically, from 40 to 120° C., more specifically, from 60 to 120° C.

When PTFE as the polymer receives a shear force by such high shear mixing, the configuration in which the polymer is fiberized to bind the active material and the conductive material is known in the art.

Then, when the fiberization composition is formed by the high shear mixing, the step of forming it into a film form is performed, wherein the forming of step (c) can be performed by a hot rolling method using a calender.

At this time, the calender may be formed on a calender roll. At this time, the diameter of the roll may be, for example, 50 to 1000 mm, specifically, 100 to 1000 mm, more specifically, 100 to 500 mm.

Further, the surface temperature of the calender roll may be from 20 to 200° C., specifically from 40 to 150° C., more specifically from 60 to 150° C.

By applying shear pressure by such a calender roll, a free-standing film can be finally manufactured.

The thickness of the free-standing film thus manufactured may be 10 to 1000 μm, specifically, 50 to 500 μm, and more specifically, 100 to 500 μm.

That is, the free-standing film for a dry electrode according to the present disclosure can be manufactured thick, and thus is suitable for manufacturing a thick-film electrode.

Meanwhile, according to another embodiment of the present disclosure, there is provided a dry electrode further comprising a current collector, and the free-standing film according to claims 1 to 6 formed on the current collector, wherein the current collector has a structure in which a primer layer is coated on a metal foil.

The PTFE polymer used for the manufacture of the free-standing film binds the active material and the conductive material through fiberization and can be manufactured in the form of a film. However, since it does not have an adhesive force to the current collector, it is possible to ensure the binding force between the current collector and the free-standing film by using the current collector of the type coated with the primer layer.

The current collector is not particularly limited as long as it has high conductivity without causing a chemical change in the battery. For example, stainless steel, aluminum, nickel, titanium, sintered carbon, and a material formed by surface-treating a surface of aluminum or stainless steel surface with carbon, nickel, titanium, silver, or the like can be used. The current collector may have fine irregularities formed on a surface thereof or may process in a mesh form to enhance the bonding strength of the positive electrode active material, and may be used in various forms such as a film, a sheet, a foil, a net, a porous body, a foaming body, and a non-woven fabric structure.

The primer layer may be wholly or partially coated onto the current collector, and in detail, may be coated wholly.

Such a primer layer may include a conductive material and a binder. The conductive material is not limited as long as it is a conductive material, and for example, it may be a carbon-based material such as carbon black, carbon nanotubes, graphene, or graphite. The binder may include a fluorine-based binder (including PVDF and PVDF copolymer), an acrylic binder, and an aqueous binder that can be dissolved in a solvent.

Binding of the free-standing film and the primer layer-coated current collector may be performed by lamination.

The lamination may also be performed by a lamination roll, wherein the lamination roll may be maintained at a temperature of 80° C. to 200° C.

Meanwhile, according to another embodiment of the present disclosure, a secondary battery including the dry electrode is provided.

Specifically, the electrode assembly including the dry electrode, the separator, and the counter electrode may have a structure incorporated into the battery case together with the electrolyte. Since other configurations of the secondary battery are well known in the prior art, a description thereof will be omitted.

Hereinafter, the present disclosure will be described in detail by way of Examples, Comparative Examples, and Experimental Examples so that those skilled in the art can easily understand.

REFERENCE EXAMPLE

A sample was positioned while being careful so that polytetrafluoroethylene (PTFE) prevents the maximum shear force from being applied on the carbon tape, and the specimen was treated, and an SEM photograph thereof was taken and shown in FIG. 1.

<Production of Surface-Oxidized Vapor Grown Carbon Fibers (Ox-VGCF) with Increased Surface Oxygen Functional Groups>

Commercially available VGCF (VGCF-H from Showadenko) was mixed with 30 wt % $HNO_3$ solution, and the mixture was stirred at 60° C. for 8 hours, subjected to oxidization treatment, washed thoroughly with distilled water, and then dried in a vacuum oven at 150° C. for 24 hours. Thereby, surface-oxidized vapor grown carbon fiber (Ox-VGCF) (the content of surface oxygen functional groups is about 10.3 wt %, average diameter: 150 nm, average length: 6 μm, specific surface area: 13 m²/g, graphitization degree: 0.42) was produced.

The content of oxygen functional groups on the surface was determined by Elemental Analysis. Specifically, the C, H, N element content of the support was measured by elemental analyzer (CHN-coder MT-5, Yanako) to calculate the Oxygen Differential by reflecting the amount of residual ash.

For the measurement of the average diameter and average length of the support, the support solution diluted to 1 wt % in an acetone solvent was dropped onto a Si wafer and dried. This was measured by SEM (Scanning Electron Microscopy, JEOL, JSM-7500F), and the average value of diameter and length for 300 individuals was calculated.

Further, the specific surface area was measured by a 6-point BET method according to nitrogen gas adsorption using a specific surface area analyzer (Belsorp-II mini by Bell Japan Inc).

The graphitization degree (ID/IG ratio) was measured by analyzing a Raman spectrum with an Ar-ion laser having a wavelength of 514.5 nm through a Raman spectrum measuring device (NRS-2000B, Jasco).

Preparation Example 1

Polytetrafluoroethylene (PTFE) as a binder, and a surface-oxidized vapor grown carbon fiber (Ox-VGCF) with increased surface oxygen functional group were prepared in a weight ratio of 1:1, and pre-mixed 3 times at 5000 rpm at intervals of 1 minute using a powder mixer (KM Tech) equipped with a cooler cooled to 5° C. to prepare a mixture. The mixture was grinded/dispersed/supported using an Air Jet-mill (Sturtevant, Micronizer) equipment, wherein the feeding condition was 5 kgf/cm², and the grinding condition was 3 kgf/cm².

An SEM photograph of the mixture prepared above was taken and shown in FIG. 2 below.

Preparation Example 2

Polytetrafluoroethylene (PTFE) as a binder, and a surface-oxidized vapor grown carbon fibers (Ox-VGCF) with increased surface oxygen functional group were prepared in a weight ratio of 1:1, and pre-mixed 3 times at 5000 rpm at intervals of 1 minute using a powder mixer (KM Tech) equipped with a cooler cooled to 5° C. to prepare a mixture.

Preparation Example 3

Polytetrafluoroethylene (PTFE) as a binder and commercially available carbon fiber (Showadenko, VGCF-H) that has not been subjected to surface oxidation were prepared in a weight ratio of 1:1, and pre-mixed 3 times at 5000 rpm at intervals of 1 minute using a powder mixer (KM Tech) equipped with a cooler cooled to 5° C. to prepare a mixture. The mixture was grinded/dispersed/supported using Air Jet-mill (Sturtevant, Micronizer) equipment, wherein the feeding condition was 5 kgf/cm², and the grinding condition was 3 kgf/cm².

Preparation Example 4

Polytetrafluoroethylene (PTFE) as a binder and a commercially available active carbon (Kuraray, YP-80F) as a support were prepared in a weight ratio of 1:1, and pre-mixed 3 times at 5000 rpm at intervals of 1 minute, using a powder mixer (KM Tech) equipped with a cooler cooled to 5° C. to prepare a mixture. The mixture was grinded/dispersed/supported using Air Jet-mill (Sturtevant, Micronizer) equipment, wherein the feeding condition was 5 kgf/cm², and the grinding condition was 3 kgf/cm².

Preparation Example 5

Polytetrafluoroethylene (PTFE) as a binder, and a commercially available active carbon (Kuraray, YP-80F) as a support were prepared in a weight ratio of 1:1, and pre-mixed 3 times at 5000 rpm at intervals of 1 minute using a powder mixer (KM Tech) equipped with a cooler cooled to 5° C.

Preparation Example 6

Polytetrafluoroethylene (PTFE) as a binder, and a commercially available carbon black (Imerys, Super C45) as a support were prepared in a weight ratio of 1:1, and mixture pre-mixed 3 times at 5000 rpm at intervals of 1 minute using a powder mixer (KM Tech) equipped with a cooler cooled to 5° C. to prepare a mixture. The mixture was grinded/dispersed/supported using an Air Jet-mill (Sturtevant, Micronizer) equipment, wherein the feeding condition was 5 kgf/cm², and the grinding condition was 3 kgf/cm².

Preparation Example 7

Polytetrafluoroethylene (PTFE) as a binder, and a commercially available active carbon (Kuraray, YP-80F) as a support were prepared in a weight ratio of 1:1, and pre-mixed 3 times at 5000 rpm at intervals of 1 minute using a powder mixer (KM Tech) equipped with a cooler cooled to 5° C. to prepare a mixture.

Preparation Example 8

Polytetrafluoroethylene (PTFE) as a binder and commercially available active carbon (Kuraray, YP-80F), and commercially available carbon fiber (Showadenko, VGCF-H) without surface oxidation treatment were prepared in a weight ratio of 2:1:1, and pre-mixed 3 times at 5000 rpm at intervals of 1 minute using a powder mixer (KM Tech) equipped with a cooler cooled to 5° C. to prepare a mixture.

Example 1

96 g of $LiMn_2O_4$ as positive electrode active material and 4 g of the mixture prepared in Preparation Example 1 as a conductive material and binder were dispersed three times at 10000 rpm at intervals of 1 minute using a powder mixer (KM Tech) equipped with a cooler cooled to 5° C. to obtain a mixture, and the mixture was put into a high shear mixer Twin Screw Kneader (Irie Shokai, PBV-0.1L), and mixed at a temperature of 90° C. under 100 rpm for 3 minutes to prepare a fiberization composition.

The SEM photograph of the fiberization composition is shown in FIG. 3.

Referring to FIG. 3, it can be seen that the PTFE binder is uniformly fiberized as a whole.

The fiberization composition was put into a lab calender (roll diameter: 200 mm, roll temperature: 100° C., 20 rpm) to adjust the distance between the rolls, thus finally manufacturing a free-standing film having a thickness of 200 μm.

Example 2

A free-standing film having a thickness of 200 μm was manufactured in the same manner as in Example 1, except that the mixture prepared in Preparation Example 2 was used as a conductive material and a binder in Example 1.

Comparative Example 1

A free-standing film having a thickness of 200 μm was manufactured in the same manner as in Example 1, except that the mixture prepared in Preparation Example 3 was used as a conductive material and a binder in Example 1.

Comparative Example 2

A free-standing film having a thickness of 200 μm was manufactured in the same manner as in Example 1, except that the mixture prepared in Preparation Example 4 was used as a conductive material and a binder in Example 1.

Comparative Example 3

A free-standing film having a thickness of 200 μm was manufactured in the same manner as in Example 1, except that the mixture prepared in Preparation Example 5 was used as a conductive material and a binder in Example 1.

Comparative Example 4

A free-standing film having a thickness of 200 μm was manufactured in the same manner as in Example 1, except that the mixture prepared in Preparation Example 6 was used as a conductive material and a binder in Example 1/

Comparative Example 5

A free-standing film having a thickness of 200 μm was manufactured in the same manner as in Example 1, except that the mixture prepared in Preparation Example 7 was used as a conductive material and a binder in Example 1.

Comparative Example 6

A free-standing film having a thickness of 200 μm was manufactured in the same manner as in Example 1, except that the mixture prepared in Preparation Example 8 was used as a conductive material and a binder in Example 1.

Experimental Example 1

The free-standing films were placed on one side of an aluminum foil (20 μm, Primer Coated Al Foil, Dongwon Systems) coated with a primer layer mixed with carbon black: PVDF binder, and an electrode was prepared by lamination through a lamination roll maintained at 120° C.

The electrode and lithium metal was used as a counter electrode, and an electrolyte solution containing 1 M $LiPF_6$ in a solvent of EC:DMC:DEC=1:2:1 was used to manufacture a coin-type half-cell.

The coin-type half-cell manufactured above was charged and discharged at 25° C. in a voltage range of 3.0 to 4.30 V under a current condition of 0.2 C-rate, the discharge capacity ratio when charging and discharging was performed under a current condition of 2.0 C-rate relative to the discharge capacity was measured, and the results are shown in Table 1 below.

TABLE 1

|  | 2.0 C discharge capacity ratio (%, relative to 0.2 C discharge capacity) |
| --- | --- |
| Example 1 | 98.3 |
| Example 2 | 97.1 |
| Comparative Example 1 | 95.7 |
| Comparative Example 2 | 91.4 |
| Comparative Example 3 | 89.1 |
| Comparative Example 4 | 92.6 |
| Comparative Example 5 | 85.2 |
| Comparative Example 6 | 92.3 |

Referring to Table 1, it can be confirmed that when a surface-oxidized vapor grown carbon fiber having increased surface oxygen functional groups according to the present disclosure is used together, it can exhibit excellent battery characteristics. In particular, in the case of further mixing with an air jet-mill, a more excellent effect can be obtained.

Further, examining Comparative Example 1, even if non-oxidized VGCF is used, an improved effect can be seen by exhibiting a predetermined dispersion effect, but is not sufficient, and the effect is very poor compared to the present disclosure, and not only when active carbon and carbon black are used but also when active carbon and VGCF are used together, the effect is significantly reduced as compared with the present disclosure.

INDUSTRIAL APPLICABILITY

According to the present disclosure, the support of the surface-oxidized vapor grown carbon fiber (Ox-VGCF) is mixed together with a binder including a fibrous polymer and used in the manufacture of a free-standing film, whereby the primary particles of the fibrous polymer can be uniformly dispersed/supported in the mixture for manufacturing a free-standing film. Therefore, since the free-standing film can form a uniformly strong bond by fiberization of the fibrous polymer, it can improve electrode physical properties and thus the performance of the battery including the same can also be improved.

Additionally, by using the support, the conductive network between the active materials can be made more robust, which is more advantageous for improving battery performance.

The invention claimed is:

1. A free-standing film for a dry electrode,
the free-standing film comprising an active material, a binder including a fibrous polymer, and a support,
wherein the support comprises a surface-oxidized vapor grown carbon fiber (Ox-VGCF) comprising a surface oxygen functional group in an amount of 5 to 15 wt % based on a total weight of the surface-oxidized vapor grown carbon fiber (Ox-VGCF).

2. The free-standing film according to claim 1, wherein:
the fibrous polymer is fiberized to bind the active material and the support.

3. The free-standing film according to claim 1, wherein:
the support comprises the surface-oxidized vapor grown carbon fiber (Ox-VGCF) having an average diameter of 50 nm to 500 nm, and an average length of 1 μm to 30 μm.

4. The free-standing film according to claim 1, wherein:
the support comprises the surface-oxidized vapor grown carbon fiber (Ox-VGCF) having a specific surface area of 10 $m^2$/g to 150 $m^2$/g.

5. The free-standing film according to claim 1, wherein:
the support comprises the surface-oxidized vapor grown carbon fiber (Ox-VGCF) having a graphitization degree of 0.1 to 2.0.

6. The free-standing film according to claim 1, wherein:
an amount of the support is in a range of 0.1 wt % to 10 wt % based on a total weight of the free-standing film.

7. The free-standing film according to claim 1, wherein:
the fibrous polymer is polytetrafluoroethylene (PTFE).

8. A method for manufacturing the free-standing film as set forth in claim 1, the method comprising:
(a) mixing the binder including the fibrous polymer and the support to obtain a first mixture;
(b) mixing the mixture and the active material together to obtain a second mixture and high-shear mixing the second mixture to obtain a fiberization composition; and
(c) forming the fiberization composition into a film form,
wherein the support is the surface-oxidized vapor grown carbon fiber.

9. The method for manufacturing the free-standing film according to claim 8, wherein:
the fibrous polymer is polytetrafluoroethylene (PTFE).

10. The method for manufacturing the free-standing film according to claim 8, wherein:
the mixing (a) comprises mixing the binder including the fibrous polymer and the support at 19° C. or less, or charging the binder including the fibrous polymer and the support mixture together into a grinder after the mixing.

11. The method for manufacturing the free-standing film according to claim 10, wherein:
the grinder is an air jet mill.

12. The method for manufacturing the free-standing film according to claim 8, wherein:
the mixture has a structure in which primary particles of the fibrous polymer are uniformly dispersed and supported on a surface of the support.

13. The method for manufacturing the free-standing film according to claim 8, wherein:
the high-shear mixing (b) is performed in a range of 10 rpm to 500 rpm for 1 minute to 30 minutes.

14. The method for manufacturing the free-standing film according to claim 8, wherein:
the forming (c) is performed by a hot rolling method by a calender.

15. A dry electrode comprising:
a current collector, and the free-standing film of claim 1, which is formed on the current collector,
wherein the current collector has a structure in which a primer layer is coated on a metal foil.

16. A secondary battery comprising the dry electrode of claim 15,
wherein an electrode assembly including the dry electrode, a counter electrode, and a separator is incorporated into a battery case together with a lithium-containing non-aqueous electrolyte.

* * * * *